US012666363B1

(12) United States Patent
Lin et al.

(10) Patent No.: US 12,666,363 B1
(45) Date of Patent: Jun. 23, 2026

(54) OPTIMIZATION OF RADIO RESOURCE MANAGEMENT (RRM) BASED ON CHANNEL ASSIGNMENTS

(71) Applicant: Juniper Networks, Inc., Sunnyvale, CA (US)

(72) Inventors: May Zar Lin, San Jose, CA (US); Wenfeng Wang, Cupertino, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 577 days.

(21) Appl. No.: 17/808,467

(22) Filed: Jun. 23, 2022

(51) Int. Cl.
*H04W 52/14* (2009.01)

(52) U.S. Cl.
CPC .................................. *H04W 52/143* (2013.01)

(58) Field of Classification Search
CPC ........... H04W 52/00–60; H04W 24/08; H04W 24/02; H04W 16/18; H04W 84/12; H04W 52/143
See application file for complete search history.

(56) References Cited

U.S. PATENT DOCUMENTS

| | | | |
|---|---|---|---|
| 7,616,966 B2 | 11/2009 | Nguyen | |
| 8,681,810 B2 | 3/2014 | Nandagopalan et al. | |
| 9,197,528 B2 | 11/2015 | Babiarz et al. | |
| 9,432,999 B1 | 8/2016 | Tkach et al. | |
| 9,832,082 B2 | 11/2017 | Dade et al. | |
| 10,716,075 B1 * | 7/2020 | Choi | H04W 52/343 |
| 10,862,742 B2 | 12/2020 | Singh | |

| | | | |
|---|---|---|---|
| 10,958,537 B2 | 3/2021 | Safavi | |
| 10,958,585 B2 | 3/2021 | Safavi | |
| 10,985,969 B2 | 4/2021 | Safavi | |
| 11,129,027 B2 | 9/2021 | Wang | |
| 11,812,275 B2 | 11/2023 | Wang | |
| 11,843,957 B2 * | 12/2023 | Wang | H04W 24/02 |
| 2001/0041594 A1 | 11/2001 | Arazi et al. | |
| 2004/0022214 A1 * | 2/2004 | Goren | G01S 5/02521 |
| | | | 370/332 |
| 2004/0136318 A1 | 7/2004 | Bentley | |

(Continued)

FOREIGN PATENT DOCUMENTS

| | | |
|---|---|---|
| CN | 101521924 A | 9/2009 |
| CN | 107113795 A | 8/2017 |

(Continued)

OTHER PUBLICATIONS

Olivier, Jeunen, "A Machine Learning Approach for IEEE 802.11 Channel Allocation", 14th International Conference on Network and Service Management (CNSM 2018), (2018), 28-36.

(Continued)

*Primary Examiner* — Raymond S Dean
(74) *Attorney, Agent, or Firm* — Shumaker & Sieffert P.A.

(57) ABSTRACT

In an example, a method includes, for each of a plurality of access points (APs) in a wireless network, automatically configuring the AP with a channel-specific transmit power optimization corresponding to an assigned channel of a plurality of channels of a given frequency band, wherein the channel-specific transmit power optimization is based on a difference between attenuation of wireless signals transmitted using the assigned channel of the plurality of channels and attenuation of wireless signals transmitted using a baseline channel of the plurality of channels.

20 Claims, 14 Drawing Sheets

(56) References Cited

U.S. PATENT DOCUMENTS

| | | | |
|---|---|---|---|
| 2010/0124204 A1 | 5/2010 | Won | |
| 2010/0197317 A1 | 8/2010 | Sadek et al. | |
| 2011/0099126 A1 | 4/2011 | Belani et al. | |
| 2011/0130149 A1 | 6/2011 | Yao et al. | |
| 2011/0250858 A1 | 10/2011 | Jain et al. | |
| 2012/0208543 A1 | 8/2012 | Takagi | |
| 2012/0224483 A1 | 9/2012 | Babiarz et al. | |
| 2014/0036787 A1 | 2/2014 | Ganu et al. | |
| 2014/0036788 A1 | 2/2014 | Ganu et al. | |
| 2014/0050156 A1 | 2/2014 | Chan et al. | |
| 2014/0219119 A1 | 8/2014 | Ishida et al. | |
| 2015/0038148 A1 | 2/2015 | Park et al. | |
| 2015/0382348 A1* | 12/2015 | Hara | H04W 72/0453 |
| | | | 370/329 |
| 2016/0113026 A1* | 4/2016 | Ezri | H04W 16/10 |
| | | | 370/329 |
| 2016/0174217 A1 | 6/2016 | Salem et al. | |
| 2016/0192378 A1 | 6/2016 | Goodson et al. | |
| 2017/0231011 A1 | 8/2017 | Park et al. | |
| 2017/0238320 A1 | 8/2017 | Fukuta et al. | |
| 2017/0324439 A1 | 11/2017 | Desai et al. | |
| 2017/0325104 A1 | 11/2017 | Desai et al. | |
| 2019/0007856 A1 | 1/2019 | Desai | |
| 2019/0098662 A1 | 3/2019 | Aijaz et al. | |
| 2020/0213236 A1* | 7/2020 | Safavi | H04L 41/0661 |
| 2020/0236008 A1* | 7/2020 | Safavi | H04L 43/091 |
| 2021/0022008 A1 | 1/2021 | Jeon et al. | |
| 2021/0143895 A1 | 5/2021 | Kim | |
| 2021/0194763 A1 | 6/2021 | Abedini et al. | |
| 2021/0306201 A1 | 9/2021 | Wang et al. | |
| 2021/0329473 A1 | 10/2021 | Zhang et al. | |
| 2021/0409976 A1* | 12/2021 | Ergen | H04W 72/541 |
| 2022/0061051 A1* | 2/2022 | Song | H04W 72/0453 |
| 2024/0064524 A1 | 2/2024 | Wang | |

FOREIGN PATENT DOCUMENTS

| | | | |
|---|---|---|---|
| GB | 2495217 | | 4/2013 |
| KR | 20130131465 A | * | 12/2013 |

OTHER PUBLICATIONS

U.S. Appl. No. 17/303,222, filed May 24, 2021, naming inventors Safavi et al.

* cited by examiner

| Channel | $\Delta RSSI(channel)$ |
|---------|------------------------|
| 1 | $\Delta RSSI_1$ |
| 3 | $\Delta RSSI_3$ |
| 5 | $\Delta RSSI_5$ |
| ... | ... |
| ... | ... |
| ... | ... |
| 233 | $\Delta RSSI_{233}$ |

| Channel | Distance | $\Delta RSSI(channel)$ |
|---------|----------|------------------------|
| 1 | $d1$ | $\Delta RSSI_{1-1}$ |
|   | $d2$ | $\Delta RSSI_{1-2}$ |
|   | ... | ... |
|   | $dn$ | $\Delta RSSI_{1-n}$ |
| 2 | $d1$ | $\Delta RSSI_{2-1}$ |
|   | $d2$ | $\Delta RSSI_{2-2}$ |
|   | ... | ... |
|   | $dn$ | $\Delta RSSI_{2-n}$ |
| ... | ... | ... |
| ... | ... | ... |
| ... | ... | ... |
| $i$ | $d1$ | $\Delta RSSI_{i-1}$ |
|   | $d2$ | $\Delta RSSI_{i-2}$ |
|   | ... | ... |
|   | $dn$ | $\Delta RSSI_{i-n}$ |

OPTIMIZATION OF RADIO RESOURCE MANAGEMENT (RRM) BASED ON CHANNEL ASSIGNMENTS

The disclosure relates generally to computer networks and, more specifically, to radio resource management in a wireless network.

BACKGROUND

The IEEE 802.11 standard defines operation for wireless networks in the 2.4 GHz, 5 GHz, and 6 GHz frequency ranges (also referred to as frequency bands). In general a 2.4 GHz connection travels farther at lower speeds, while 5 GHz and 6 GHz connections provide faster speeds at shorter range. The 2.4 GHz frequency range supports up to three 20 MHz channels (channel numbers 1, 6, and 11) and a single channel (channel 14) having a bandwidth of 40 MHz. The 5 GHz frequency band supports channel numbers ranging from 36 to 165, and the 6 GHz frequency band supports channel numbers ranging from 1 to 233. Both the 5 GHz and 6 GHz frequency bands provide for channel widths of 20 MHz, 40 MHz, 80 MHz, and 160 MHz.

SUMMARY

In general, this disclosure describes techniques for optimization of radio resource management in a given frequency band on a per channel basis. Although examples with respect to the 6 GHz frequency band are described herein, the techniques also apply to other frequency bands (e.g., lower frequency bands such as the 2.4 GHz and 5 GHz frequency bands, as well higher frequency bands), and the disclosure is not limited in this respect.

More specifically, the disclosure describes techniques for optimizing one or more operating parameters for a plurality of APs in a wireless network operating in a given frequency band based on the channel assignments for the plurality of APs. The optimized operating parameters may include, for example, channel-specific transmit power optimizations corresponding to each of a plurality of channels of the given frequency band. For example, for each specific channel of a given frequency band, a computing device, such as a network management system (NMS) or other computing device configured for radio resource management of a wireless network, determines channel-specific optimized operating parameters (e.g., optimized transmit power levels) for APs assigned to transmit and receive wireless signals using the specific channel. In some examples, the computing device automatically reconfigures one or more APs assigned to a specific channel with the channel-specific optimized operating parameters determined for the specific channel. In some examples, the computing device may further generate a notification indicative of the optimized operating parameters for display on a user computing device associated with, for example, an IT technician.

The techniques of the disclosure may provide one or more technical advantages and practical applications. For example, the techniques provide for automatic optimization of one or more operating parameters for APs in a wireless network on a per channel basis. Automatic optimization of the operating parameters for each channel of a given frequency band helps to reduce co-channel interference across all channels of the given frequency band. At the same time, the techniques help to ensure that transmit power levels, particularly for wireless signals transmitted using the higher frequency channels, are sufficient to provide good wireless network performance at greater distances. In some examples, the system determines the one or more optimized operating parameters specific to each channel, and also reconfigures the APs in the wireless network for operation using the optimized operating parameters corresponding to their specific channel assignments. By automatically reconfiguring the APs with operating parameters optimized for each specific channel, APs in a wireless network are able to continuously and/or periodically self-optimize based on their assigned operating channel, thus reducing time and costs associated with manual radio resource management. By reducing co-channel interference and/or increasing the reliability of the signal at greater distances, the techniques improve the overall operational performance of the wireless network, further resulting in an improved user experience.

In one example, the disclosure is directed to a system comprising: a computing device configured to manage transmit power of a plurality of access points (APs) in a wireless network, wherein each of the plurality of APs is assigned to one channel of a plurality of channels of a frequency band, comprising: one or more processors; and a memory comprising instructions that when executed by the one or more processors cause the one or more processors to: automatically configure one or more of the plurality of APs with a channel-specific transmit power optimization corresponding to the assigned channel, wherein the channel-specific transmit power optimization is based on a difference between attenuation of wireless signals transmitted using the assigned channel of the plurality of channels and attenuation of wireless signals transmitted using a baseline channel of the plurality of channels.

In another example, the disclosure describes a method comprising: for each of a plurality of access points (APs) in a wireless network, automatically configuring the AP with a channel-specific transmit power optimization corresponding to an assigned channel of a plurality of channels of a given frequency band, wherein the channel-specific transmit power optimization is based on a difference between attenuation of wireless signals transmitted using the assigned channel of the plurality of channels and attenuation of wireless signals transmitted using a baseline channel of the plurality of channels.

In another example, the disclosure describes a non-transitory computer-readable medium comprising instructions that when executed by the one or more processors cause the one or more processors to: for each of a plurality of access points (APs) in a wireless network, automatically configure the AP with a channel-specific transmit power optimization corresponding to an assigned channel of a plurality of channels of a given frequency band, wherein the channel-specific transmit power optimization is based on a difference between attenuation of wireless signals transmitted using the assigned channel of the plurality of channels and attenuation of wireless signals transmitted using a baseline channel of the plurality of channels.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
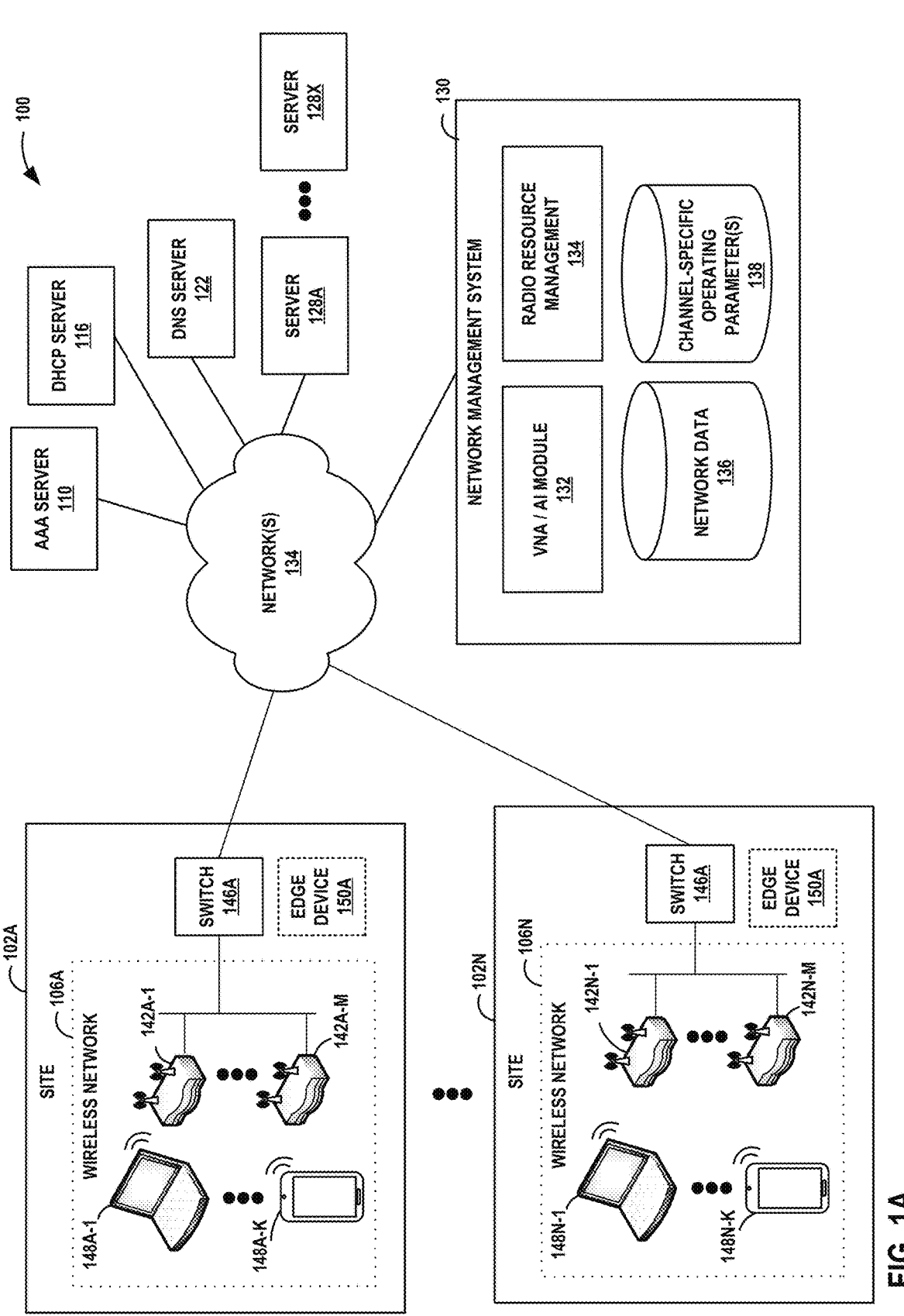
FIG. 1A is a diagram of an example network system in which one or more operating parameters of APs operating in a given frequency band are optimized on a per channel basis, in accordance with one or more techniques of the disclosure.

FIG. 1A is a diagram of an example network system 100 in which one or more operating parameters for APs in a wireless network operating in a given frequency band are optimized on a per channel basis, in accordance with one or more techniques of the disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as enterprises, offices, hospitals, airports, stadiums, or retail outlets, often install complex wireless network systems, including a network of wireless access point (AP) devices, e.g., ΔP devices 142, throughout the premises to provide wireless network services to one or more wireless client devices. In this example, site 102A includes a plurality of AP devices 142A-1 through 142A-N. Similarly, site 102N includes a plurality of AP devices

142N-1 through 142N-N. Each AP device 142 may be any type of wireless access point, including, but not limited to, a commercial or enterprise access point, a router, or any other device capable of providing wireless network access.

To provide wireless networks 106, APs 142 are configured for wireless communication in one or more wireless frequency bands. For example, the wireless frequency bands may include, but are not limited to, a 2.4 GHz frequency band, a 5 GHz frequency band, a 6 GHz frequency band, and/or any other lower or higher frequency bands. Each frequency band is comprised of a plurality of channels. At any given time, each of APs 142 is assigned to operate (e.g., transmit and receive wireless signals) on a specific one of the plurality of channels. The channel assignments may be carried out by, for example, radio resource management module 134 of network management system (NMS) 130 or other computing device configured to manage radio resources in a wireless network.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may include a plurality of states or parameters indicative of one or more aspects of wireless network performance. The data may be ingested form numerous sources, including client devices, APs, switches, firewalls etc. The network data may be stored in a database, such as network data 136 within NMS 130 or, alternatively, in an external database. In general, NMS 130 may provide a cloud-based platform for network data acquisition, monitoring, activity logging, reporting, predictive analytics, network anomaly identification, and alert generation. In some examples, NMS 130 uses a combination of artificial intelligence, machine learning, and data science techniques to optimize user experiences and simplify operations across any one or more of wireless access, wired access, and SD-WAN domains.

NMS 130 observes, collects and/or receives network data 136 for a variety of client devices, such as SDK clients, named assets, and/or client devices connected/unconnected to the wireless network. The network data is indicative of one or more aspects of wireless network performance. Network data 136 may take the form of data extracted from messages, counters and statistics, for example. The network data may be collected and/or measured by one or more UEs 148 and/or one or more AP devices 142 in a wireless network 106. Some of the network data 136 may be collected and/or measured by other devices in the network system 100, such as switches or firewalls. In accordance with one specific implementation, network management server 130 includes at least one computing device or processor. In accordance with other implementations, NMS 130 may comprise one or more computing devices, processors, dedicated servers, virtual machines, containers, services or other forms of environments for performing the techniques described herein.

NMS 130 may include a virtual network assistant (VNA) 132 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 132 may, for example, include a network data processing platform configured to process hundreds or thousands of concurrent streams of network data from UEs 148, sensors and/or agents associated with AP devices 142 and/or nodes within network 134. For example, VNA 132 of NMS 130 may include a network performance engine that automatically determines one or more service level experience (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client's device received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 132 may also include an underlying analytics and network error identification engine and alerting system. VNA 132 may further provide real-time alerting and reporting to notify administrators or IT personnel of any predicted events, anomalies, trends, and may perform root cause analysis and automated or assisted error remediation.

In some examples, VNA 132 of NMS 130 may apply machine learning techniques to identify the root cause of error conditions or poor wireless network performance metrics detected or predicted from the streams of event data. VNA 132 may generate a notification indicative of the root cause and/or one or more remedial actions that may be taken to address the root cause of the error conditions or poor wireless network performance metrics. In some examples, if the root cause may be automatically resolved, VNA 132 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 132 may be part of the NMS 130, may execute on other servers or execution environments, or may be distributed to nodes within network 134 (e.g., routers, switches, controllers, gateways and the like). Example details of these and other operations implemented by the VNA 132 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with the techniques described in this disclosure, NMS 130 includes a radio resource management module 134 configured to optimize one or more operating parameters of APs 142 on a per channel basis. Channel-specific operating parameters 138 include one or more optimized operating parameters determined for each specific channel of a given frequency band specific determined and/or applied in accordance with one or more techniques of the disclosure.

Figure 1B:
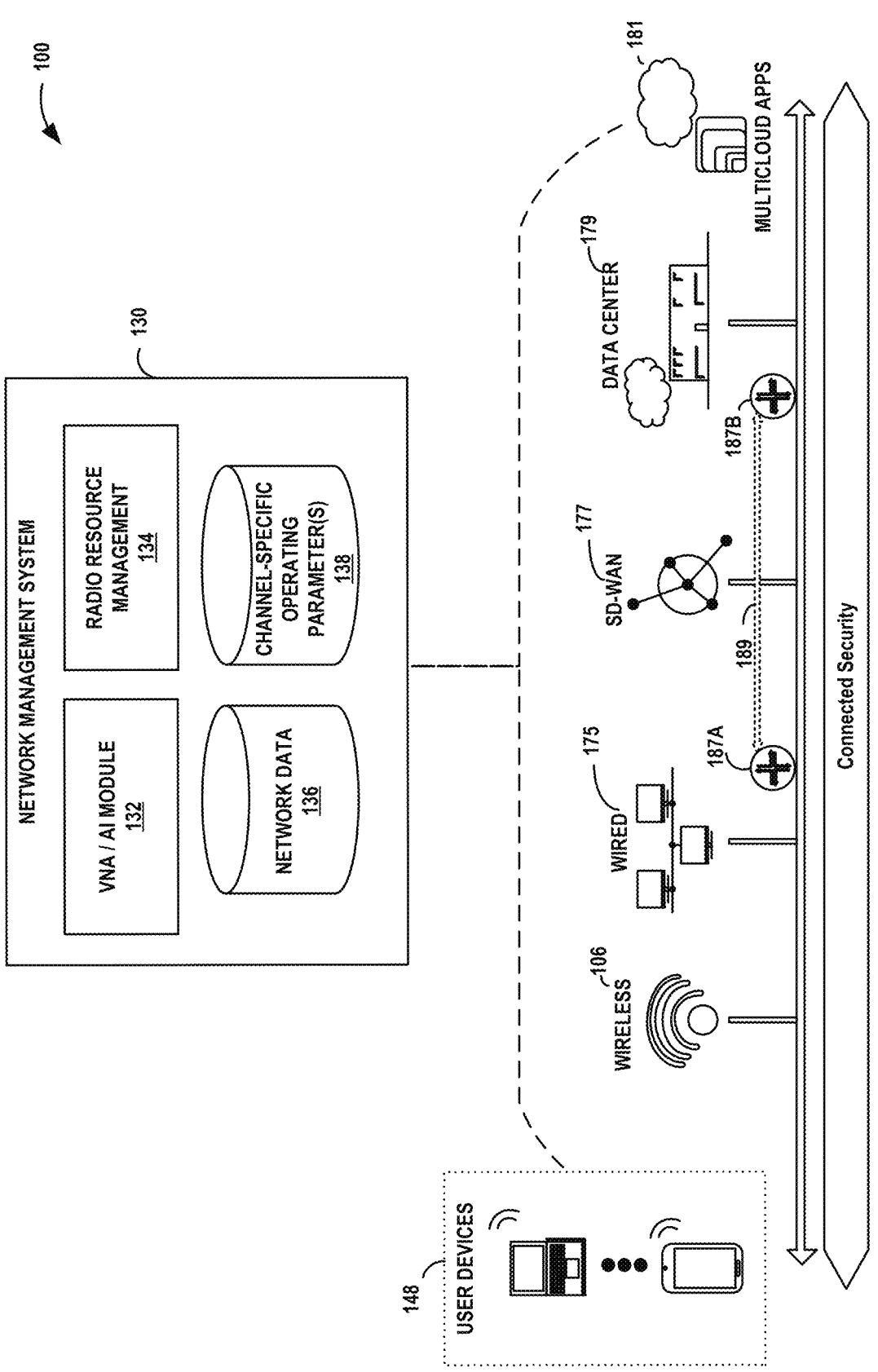
FIG. 1B is a block diagram illustrating further example details of the network system of FIG. 1A.

FIG. 1B is a block diagram illustrating further example details of the network system of FIG. 1A. As described above with respect to FIG. 1A, NMS 130 executing radio resource management module 134, optimizes one or more operating parameters of APs 142 in a wireless network 106 on a per channel basis in accordance with one or more techniques of the disclosure.

In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1). NMS 130 includes a virtual network assistant 132, radio resource management module 134, network data 136, and channel-specific operating parameters 138. Channel-specific operating parameters 138 include one or more optimized operating parameters determined for each specific channel of a given frequency band determined and/or applied in accordance with one or more techniques of the disclosure.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

Figure 2:
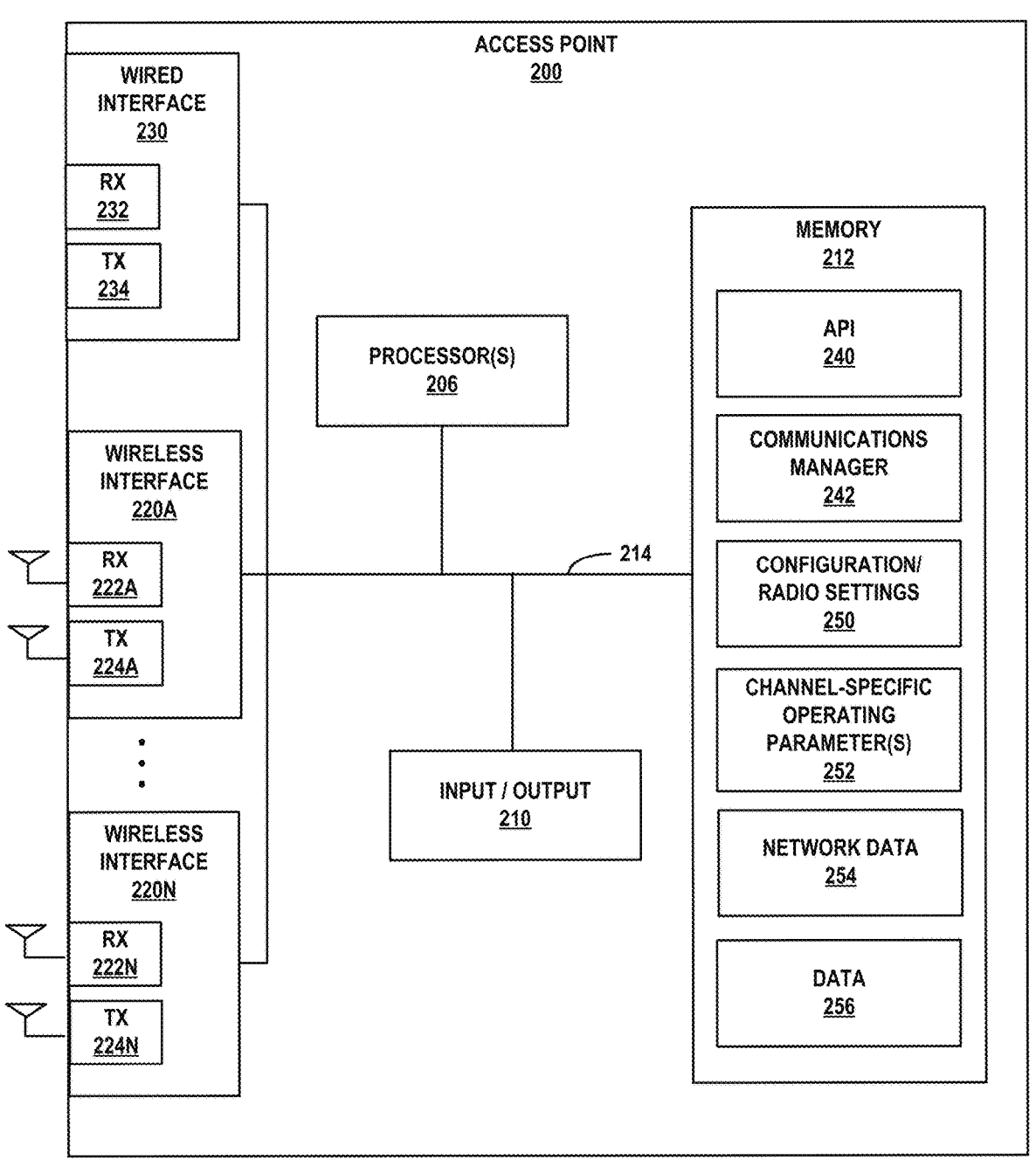
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. Wireless interfaces 220A-220N represent wireless network interfaces and include receivers 222A-222N, respectively, each including a receive antenna via which access point 200 may receive wireless signals from wireless communications devices, such as UEs 148 of FIG. 1A, other APs 200, and/or any other wireless device. Wireless interfaces 220A-220N further include transmitters 224A-224N, respectively, each including transmit antennas via which access point 200 may transmit wireless signals to wireless communications devices, such as UEs 148 of FIG. 1A, other APs 200, and/or any other wireless device. In some examples, wireless interfaces 220A-200N may include one or more Wi-Fi 802.11 interfaces (e.g., 2.4 GHz and/or 5 GHz) one or more Bluetooth interface and/or a Bluetooth Low Energy (BLE) interfaces. One or more of the interfaces 200A-200N may be used to perform RTT measurements. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software and/or data including an application programming interface (API) 240, a communications manager 242, configuration/radio settings 250, channel operating parameters 252, network data 254, and data storage 256. In some examples, network data 254 includes any type of data measured or collected by AP 200 including, for example, received signal strength indicators (RSSIs) of wireless signals received from one or more other APs in the wireless network, RSSI s of wireless signals received from one or more wireless clients (UEs). Data 256 may further store any data used and/or generated by access point device 200, including data collected from UEs 148 and/or one or more other APs 200.

Communications manager 242 includes program code that, when executed by processor(s) 206, allow access point 200 to communicate with UEs 148, other APs 142, and/or network(s) 134 via any of interface(s) 230 and/or 220A-220B. Configuration settings 250 include any device settings for access point 200 such as default or adjusted radio settings for each of wireless interface(s) 220A-220B. In accordance with one or more techniques of the disclosure, channel-specific operating parameters 252 include one or more optimized operating parameters (e.g., transmit power optimizations) determined for each specific channel of a given frequency band in accordance with one or more techniques of the disclosure. In the event AP 200 is configured to communicate over multiple frequency bands, such as the 2.4 GHz, 5 GHz, and/or 6 GHz frequency bands, channel-specific operating parameters 252 may include channel-specific operating parameters for each of the frequency bands over which AP 200 is configured to communicate.

These channel-specific optimized operating parameters may be determined by, for example, NMS 130 executing radio resource management module 134 as described with respect to FIGS. 1A and 1B. In some examples, the optimized operating parameters stored in channel operating parameters are updated on a continuous, periodic, or scheduled basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3:
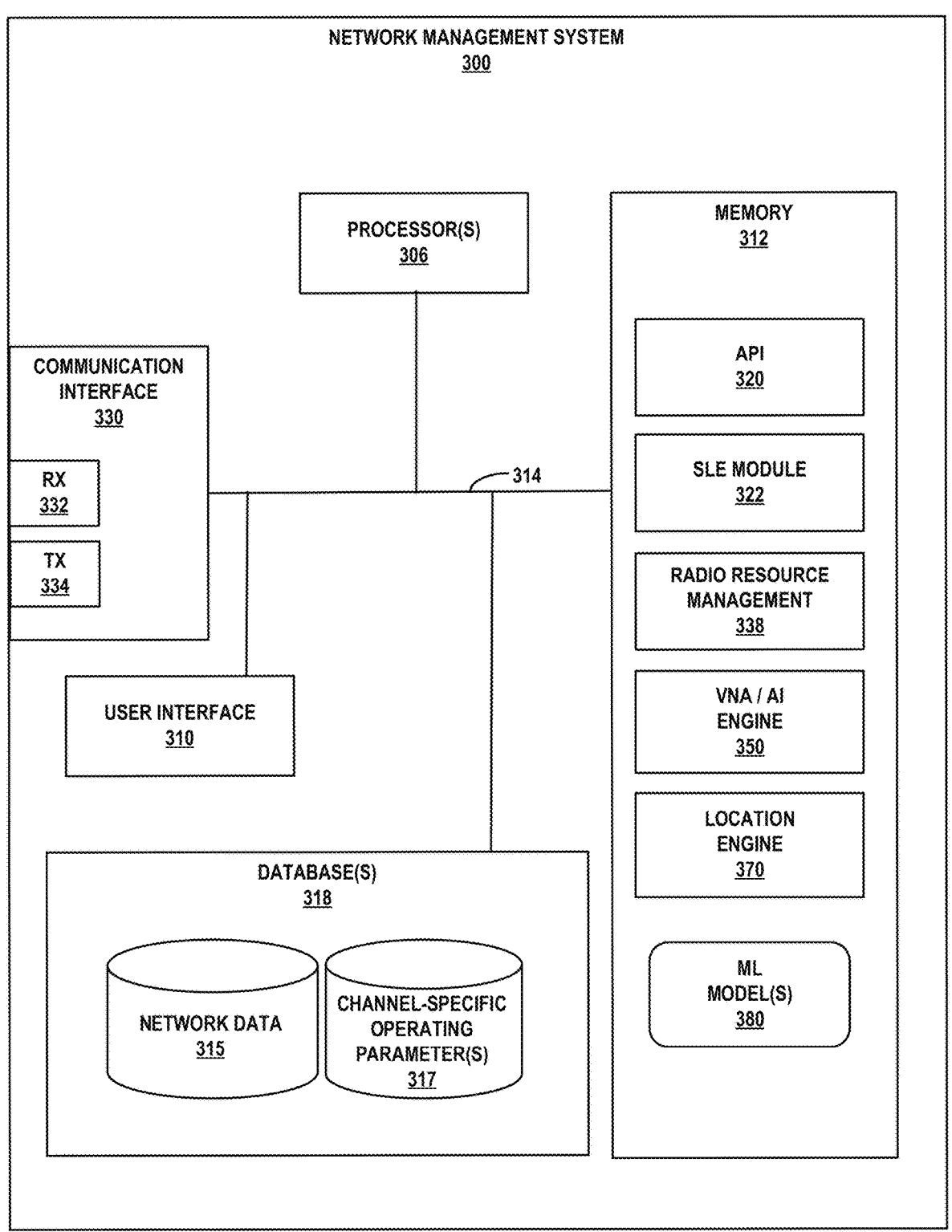
FIG. 3 is a block diagram of an example network management system configured to optimize operating parameters of APs in a wireless network on a per channel basis, in accordance with one or more techniques of the disclosure.

FIG. 3 is a block diagram of an example network management system (NMS) 300 configured to optimize one or more operating parameters for a plurality of APs in a wireless network on a per channel basis in accordance with one or more techniques of the disclosure. For example, NMS 300 is configured to optimize one or more operating parameters for a plurality of APs based on the specific channel assignments for each of the APs. NMS 300 may be used to implement, for example, NMS 130 in FIGS. 1A-1B. In such examples, NMS 300 is responsible for monitoring and management of one or more wireless networks 106A-106N at sites 102A-102N, respectively. In some examples, NMS 300 receives network data 315 collected by APs 142/200 and analyzes this data for cloud-based management of wireless networks 106A-106N. In some examples, NMS 300 may be part of another server shown in FIG. 1A, 1B or a part of any other server.

NMS 300 includes a communications interface 330, one or more processor(s) 306, a user interface 310, a memory 320, and a database 318. The various elements are coupled together via a bus 314 over which the various elements may exchange data and information.

Databases 318 include storage for data in connection with monitoring and management of wireless networks 106. Network data 315 includes any type of data measured or collected by APs 142/200 including, for example, received signal strength indicators (RSSIs) of wireless signals communicated between APs 142, RSSIs of wireless signals communicated between APs 142 and UEs 148, etc. Data 256 may further store any data used and/or generated by access point device 200, including data collected from UEs 148 and/or one or more other APs 200. In accordance with one or more techniques of the disclosure, channel-specific operating parameters 317 include one or more optimized operating parameters (e.g., transmit power optimizations) determined for each specific channel of a given frequency band. In some examples, channel-specific operating parameters 317 includes channel-specific operating parameters for each of one or more frequency bands, such as the 2.4 GHz, 5 GHz, or 6 GHz frequency bands, and/or any other wireless frequency band.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIGS. 1A-1B. The data and information received by NMS 300 may include, for example, network data and/or event log data received from APs 142 used by NMS 300 to remotely monitor and/or control the performance of wireless networks 106A-106N and to determine the locations of APs 142. NMS may further transmit data via communications interface 330 to any of network devices such as APs 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a radio resource management engine (RRM) 338, a virtual network assistant (VNA)/AI engine 350, a location engine 370, and one or more machine learning models 380. NMS 300 may also include any other programmed modules, software engines and/or interfaces configured for remote monitoring and management of wireless networks 106A-106N, including remote monitoring and management of any of AP devices 142.

RRM engine 338 monitors one or more metrics for each site 106A-106N in order to learn and optimize the power and/or radio-frequency (RF) environment at each site. For example, RRM engine 338 may monitor the coverage and capacity SLE metrics (e.g., managed by SLE module 322) for a wireless network 106 at a site 102 in order to identify potential issues with coverage and/or capacity in the wireless network 106 and to adjust radio settings of APs 142 at each site to address the identified issues. RRM engine 338 may determine channel and transmit power distribution across all AP devices 142 in each network 106A-106N. RRM engine 338 may monitor events, power, channel, bandwidth, and number of clients connected to each AP device. RRM engine 338 may measure the strength of a radio signal of client devices, such as an RSSI value. RRM engine 338 may further automatically change or update configurations of one or more AP devices 142 at a site 106 with an aim to improve the coverage and/or capacity SLE metrics and thus to provide an improved wireless experience for the user. In some examples, RRM engine 338 may use AP location information determined by AP location module 372 in order to learn and optimize the RF environment provided by the wireless network.

In accordance with one or more techniques of the disclosure, RRM 338 further includes program instructions that, when executed by one or more processors of NMS 300 and/or any other computing device, optimizes one or more operating parameters for a plurality of APs in a wireless network on a per channel basis. For example, RRM 338 determines one or more one or more optimized operating parameters, such as channel-specific transmit power optimizations, for a plurality of APs in a wireless network based on the channel assignments for the plurality of APs. The optimized operating parameters may include, for example, transmit power optimizations determined for each specific channel of the given frequency band. In some examples, RRM 338 automatically reconfigures one or more APs assigned to operate on a specific channel with the optimized operating parameters determined for the specific channel. In some examples, the RRM 338 may further generate a notification indicative of the optimized operating parameters for display on a user computing device associated with, for example, an IT technician.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. VNA/AI engine 350 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 350 may automatically invoke one or more remedial actions intended to address the identified root cause(s) of one or more poor SLE metrics. Examples of remedial actions that may be automatically invoked by VNA/AI engine 350 may include, but are not limited to, invoking RRM 338 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

SLE (service level experience) module 322 enables set up and tracking of thresholds for one or more SLE (e.g., performance) metrics for each of wireless networks 106A-106N. SLE module 322 further analyzes network data (e.g., stored as network data 316) collected by AP devices and/or UEs associated with wireless networks 106A-106N, such as any of AP devices 142 from UEs 148 in each wireless network 106A-106N. For example, AP devices 142A-1 through 142A-N collect network data from UEs 148A-1 through 148A-N currently associated with wireless network 106A (e.g., named assets, connected/unconnected Wi-Fi clients). This data, in addition to any network data collected by one or more APs 142A-1 through 142A-N in wireless network 106A, is transmitted to NMS 300 and stored as, for example, network data 315.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

Location engine 370, when executed by one or more processors 306 of NMS 300 or by any other computing device, determines the location of one or more wireless client devices (e.g., UEs 148) associated with one or more APs 142 in a wireless network. For example, location engine 370 may determines coordinate locations of one or more UEs 148 associated with a wireless network 106 with respect to a global coordinate system for the associated site 102. The coordinate locations of the UEs are determined, for example, based on coordinate locations of the APs 142 in the global coordinate system for the site and distance measurements (e.g., RSSI and/or round-trip time (RTT) measurements) between the UEs and one or more APs.

Figure 4:
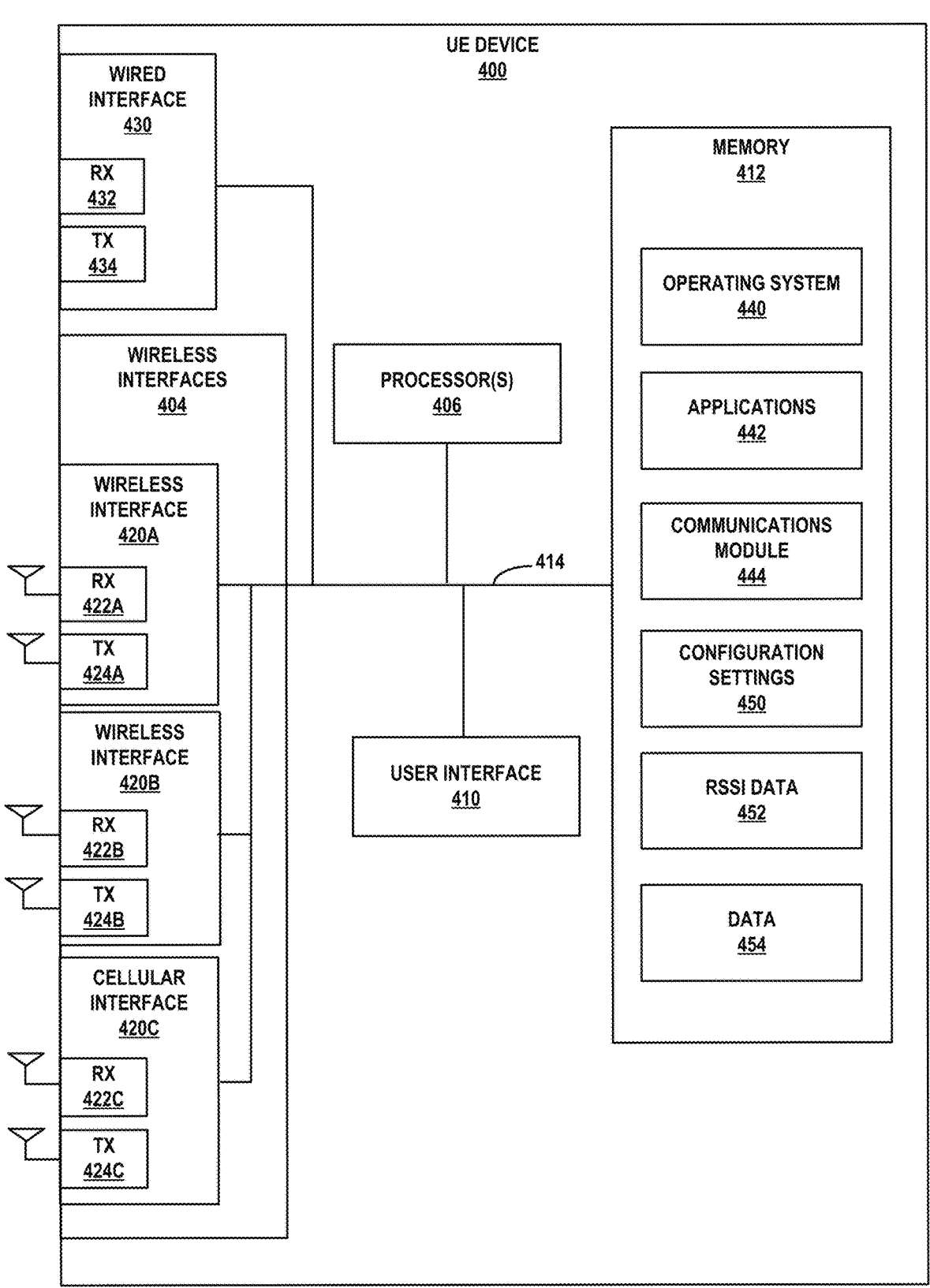
FIG. 4 is a block diagram of an example user equipment device in accordance with one or more techniques of the disclosure.

FIG. 4 shows an example user equipment (UE) device 400. Example ULE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

NMS 130 receives relevant network data from UEs 148 on a continuous basis (e.g., every 1-2 seconds or other appropriate time period). RSSI data 452 may include, for example, RSSI measurements of one or more wireless signals received from one or more AP devices by UE 400 as measured by the AP devices.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, RSSI data log 452, and data storage for network data 454. RSSI data log 452 stores RSSI values measured by UE 400 for wireless signals received from other wireless devices associated with the wireless network. For example, RSSI data log 452 includes RSSI values measured by UE 400 for wireless signals received from one or more APs. As another example, RSSI data log 452 may include RSSI values measured by UE 400 for wireless signals received from any other wireless device, such as other UEs, IoT devices, etc. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by UE 400, such as network data used to determine proximity to a proximity zone, that is collected by UE 400 and transmitted to any of AP devices 142 in a wireless network 106 for further transmission to NMS 150.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
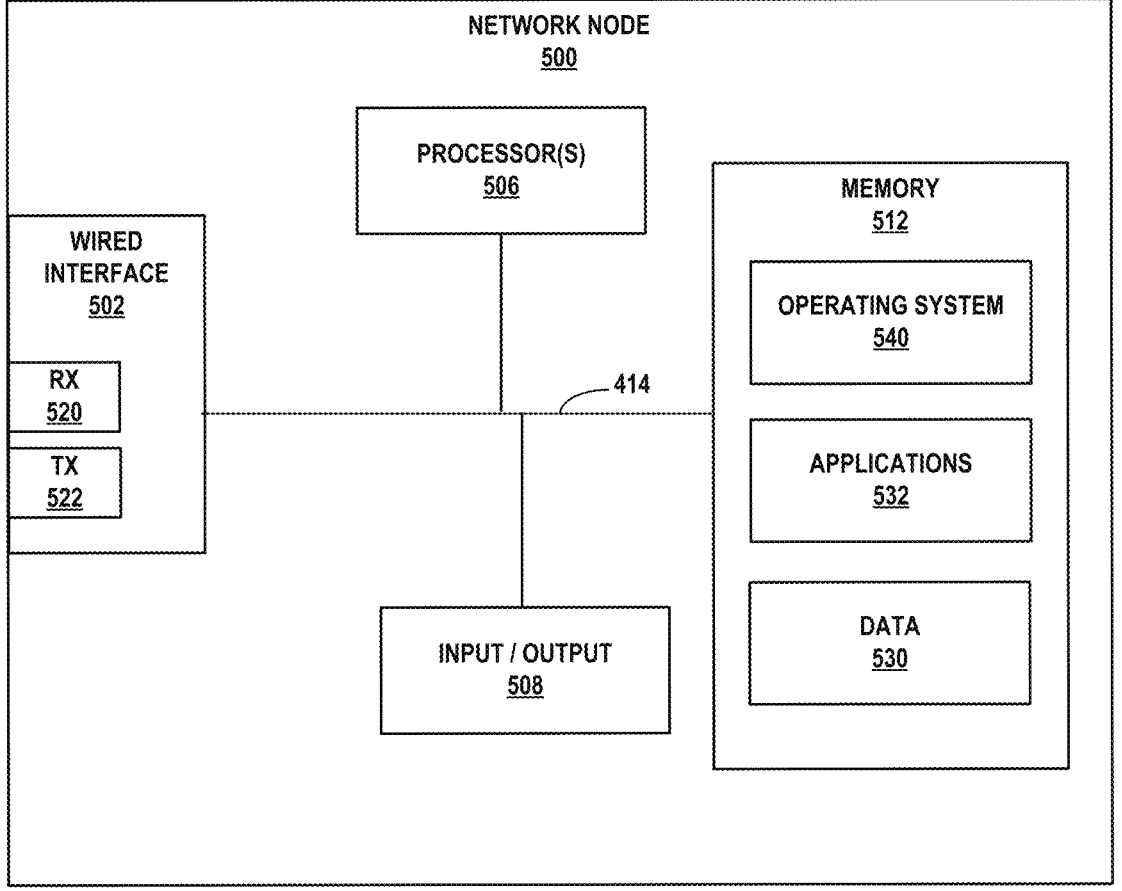
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIGS. 1A/1B, e.g., router, switch, AAA server 110, DHCP server 116, DNS server 122, VNA 132, AP location module 135, Web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including data indicative of distances between APs, and/or operation related information such as registration request, AAA services, DHCP requests, Simple Notification Service (SNS) look-ups, and Web page requests). Communications interface 502 includes a transmitter 522, via which the network node 500 can send data and information (e.g., including location information, configuration information, authentication information, web page data, etc.).

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6:
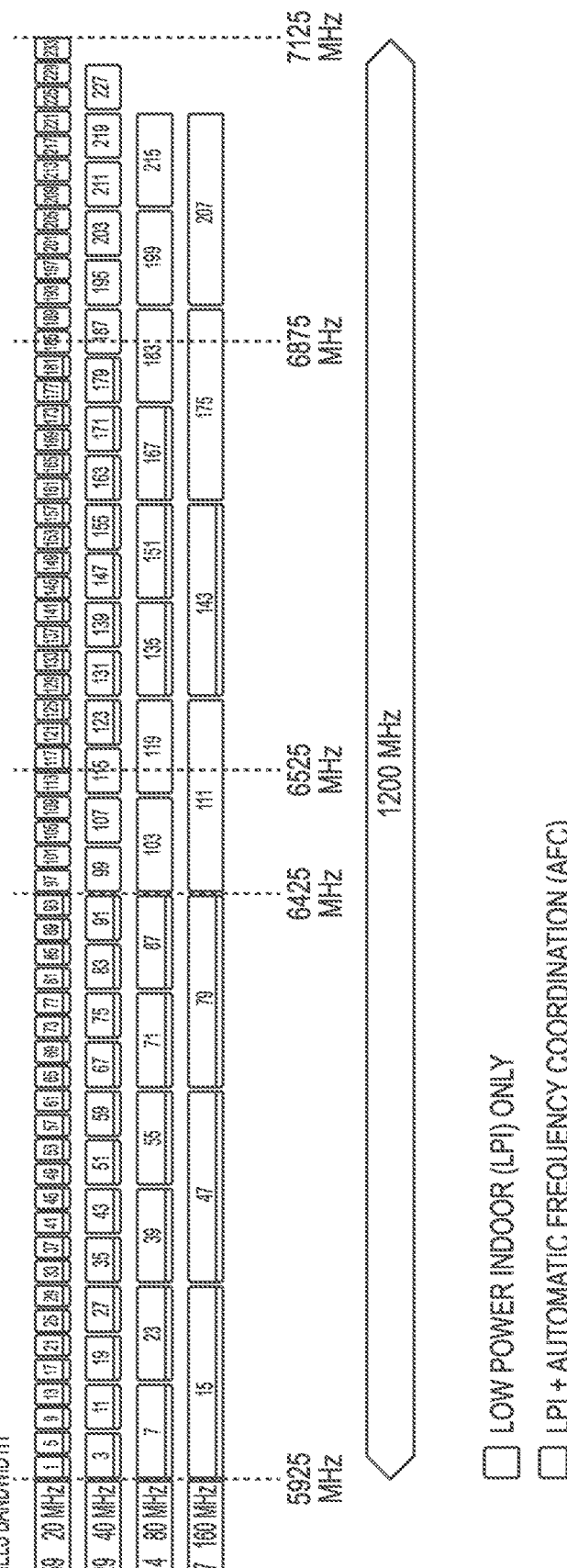
FIG. 6 is a diagram illustrating channel allocation for the 6 GHz frequency band.

FIG. 6 is a diagram illustrating channel allocation for the 6 GHz frequency band (also known as "Wi-Fi 6E") in accordance with the IEEE 802.1 lax standard. The 6 GHz frequency band includes 1200 MHz of spectrum, with 14 80 MHz channels and 7 160 MHz channels. By leveraging wider channels and the increased spectrum as compared to the 2.4 GHz and 5 GHz frequency bands, the 6 GHz frequency band can support more simultaneous users connecting to the network at high speeds with lower latency. The 6 GHz frequency band further increases the network capacity and efficiency as compared to the 2.4 GHz and 5 GHz frequency bands, which is advantageous for applications that require higher throughput, such as enterprise video streaming and video conference.

In general, this disclosure describes techniques for optimization of radio resource management on a per channel basis in a given frequency band. Although example implementations with respect to the 6 GHz frequency band are described herein, the techniques also apply to other frequency bands (e.g., lower frequency bands such as the 2.4 GHz and 5 GHz frequency bands, as well higher frequency bands), and the disclosure is not limited in this respect.

More specifically, the disclosure describes techniques for optimizing the transmit power for APs of a wireless network operating in a given frequency band on a per channel basis. For example, for each specific channel of a 6 GHz band, a computing device, such as a network management system (NMS) or other computing device executing radio resource management (RRM) for the wireless network, optimizes operating parameters (e.g., transmit power levels) for one or more APs configured to transmit wireless signals using the specific channel. The optimized operating parameters for each specific channel may take into account, for example, an amount of attenuation (e.g., decay, power loss, difference in received signal strength, etc.) experienced at a threshold distance by wireless signals transmitted using the specific channel frequency. In some examples, the computing device automatically configures one or more APs in the wireless network with optimized operating parameters associated with the specific channel assignments for the one or more APs. In some examples, the computing device further generates a notification indicative of the optimized operating parameters for the one or more APs for display on a user computing device associated with, for example, an IT technician.

According to the Friis formula, for given transmitting and receiving antennas, the ratio between received power and transmitted power is inversely proportional to the distance between the antennas squared and the wavelength of the signal squared as follows:

$$\frac{P_r}{P_t} = \frac{A_r A_t}{d^2 \lambda^2} \qquad \text{Eq. 1}$$

where:

$P_t$—is the power fed into the transmitting antenna input terminals $P_r$—is the power available at the receiving antenna output terminals $A_r$—is the effective aperture area of the receiving antenna $A_t$—is the effective aperture area of the transmitting antenna d—is the distance between the transmitting and receiving antennas λ—is the wavelength of the radio frequency.

Replacing the Effective Antenna Areas with their Gain Counterparts Yields $$\frac{P_r}{P_t} = \frac{G_r G_r (\lambda^2)}{(4\pi d)^2} \qquad \text{Eq. 2}$$

where:

$P_t$—is the power fed into the transmitting antenna input terminals $P_r$—is the power available at the receiving antenna output terminals $G_r$—is the effective receiving antenna gain $G_t$—is the effective transmitting antenna gain d—is the distance between the transmitting and receiving antennas λ—is the wavelength of the radio frequency.

As such, for a constant transmit power, the greater the distance between the transmitter and the receiver, the lower is the received power. In other words, the received power is inversely proportional to the square of the distance from the transmitter. Also, for the same transmit power and for the same distance between the transmitter and the receiver, the higher the frequency (the shorter the wavelength) the lower is the received power. In other words, for higher frequencies the power of the received signal decays faster with distance from the transmitter as compared to lower frequencies.

Figure 7A:
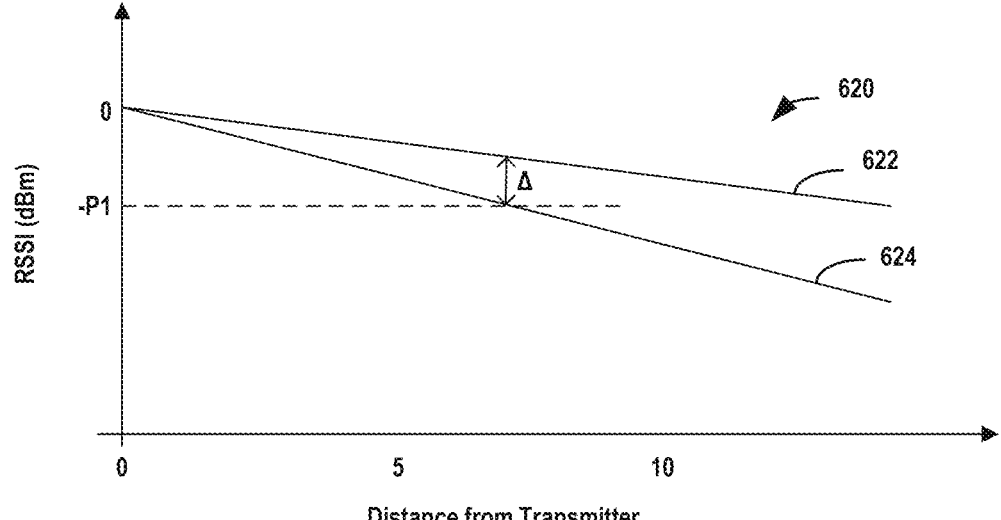
FIG. 7A is a graph of example received signal strength indicator (RSSI) values versus distance of wireless signals received at a first AP and transmitted by a second AP for two different channels of an example frequency band, in accordance with one or more techniques of the disclosure.

FIG. 7A is a simplified graph of example received signal strength indicator (RSSI) values (i.e., received power) for a wireless signal received at a first AP and transmitted by a second AP versus the distance between the two APs for two different channels of an example frequency band. Curve 622 is a plot of example RSSI values versus distance from a transmitter for a first, lower frequency channel of the example frequency band and curve 624 is a plot of example RSSI values versus distance from the transmitter for a second, higher frequency channel of the example frequency band. The RSSI values for the second, higher frequency channel decay faster as the distance from the transmitter increases as compared to the RSSI values for the first, lower frequency channel. Although the RSSI values represented by curves 622 and 624 are shown as decaying generally linearly with distance, FIG. 7A is a simplified example given for explanatory purposes only, and the disclosure is not limited in this respect. In general, the intensity of wireless signals (e.g., radio waves) over distance obeys the inverse-square law given by the Friis equation discussed above, which shows that the received power is inversely proportional to the square of the distance between the receiver and the transmitter.

Figures 7B, 7C:
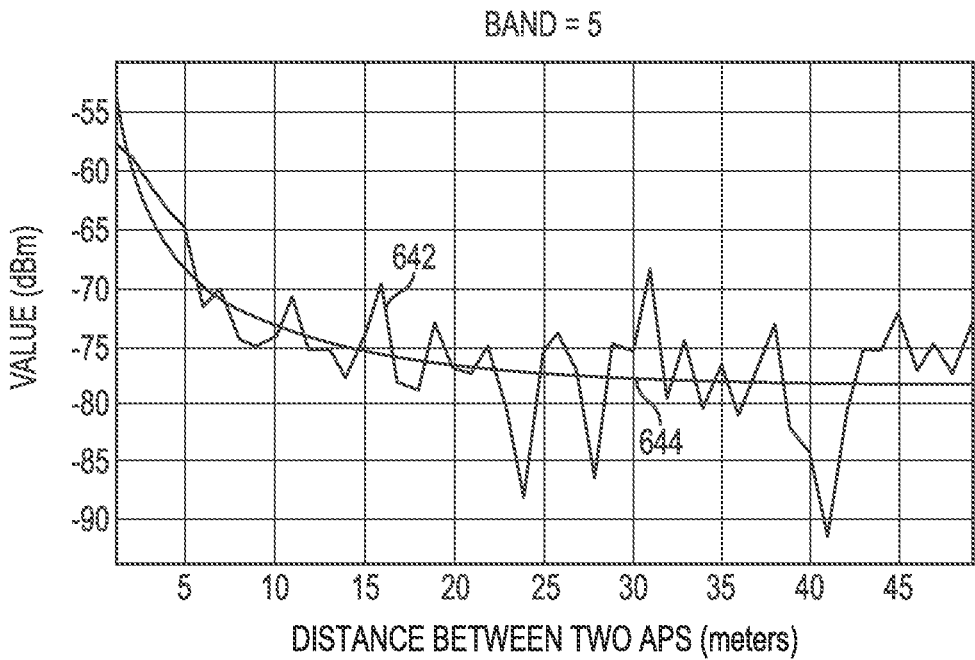
FIGS. 7B and 7C are graphs showing experimental results of RSSI values versus distance for two different channels of the 6 GHz frequency band, in accordance with one or more techniques of the disclosure.

FIGS. 7B and 7C are graphs showing experimental results of received signal strength indicator (RSSI) values versus distance for two different channels of the 6 GHz frequency band. FIG. 7B shows RSSI versus distance for channel 5 of the 6 GHz frequency band and FIG. 7C shows RSSI versus distance for channel 24 of the 6 GHz frequency band. Curves 642 and 652 are plots of the average measured RSSI values and curves 644 and 654 show fitted curves for the average RSSI values. In general, the data of FIGS. 7B and 7C illustrate that, even for channels of the 6 GHz frequency band that are relatively close together (e.g., channels 5 and 24), the RSSI of the received signal decays faster for channel 24 (the relatively higher frequency channel) as compared to channel 5 (the relatively lower frequency channel).

For the 6 GHz band, where there is a relatively large difference between the frequency of the lowest frequency channel (i.e., channel 1) as compared to the highest frequency channel (i.e., channel 233), the difference between the received signal strength (e.g., amount of attenuation, path loss, etc.) experienced by a wireless signal operating in the lowest frequency channel and that experienced by a wireless signal operating in the highest frequency channel as distance increases may be significant. As noted above with respect to FIGS. 7B and 7C, this may also be true for channels of the 6 GHz frequency band that are relatively closer together. This is in comparison to, for example, the 2.4 GHz frequency band in which, assuming the same transmit power, the difference between the received power in the lower channel and the higher channel frequencies is much smaller and may be considered to be negligible.

Thus, for certain wireless networks operating in a given frequency band having a plurality of channels, if the wireless network is optimized for operation on a specific channel, the network may exhibit sub-optimal characteristics with respect to those APs operating on different channels. For example, for the 6 GHz frequency band, if the wireless network is optimized for operation at a relatively lower frequency channel regardless of the specific channel assignments for each AP, those portions of the network operating at one or more relatively higher frequency channels may exhibit sub-optimal characteristics and vice versa.

If the network is optimized for APs for a lower frequency channel (and thus, for example, lower transmit power), for example, devices which operate at a higher frequency channel and are further from the transmitter may suffer low received signal resulting in low signal-to-noise ratio (SNR). Alternatively, if the network is optimized for the upper frequency channel, signals transmitted at a lower frequency bands (which are attenuated less as a function of distance) may travel further resulting in interference with signals from neighboring APs.

Figure 8A:
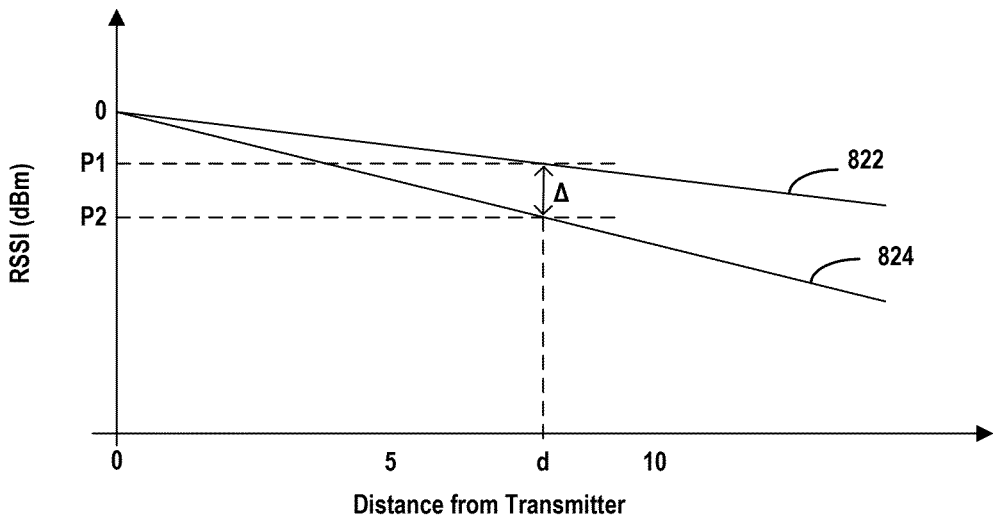
FIGS. 8A-8C are graphs of example RSSI values versus distance of wireless signals received at a first AP and transmitted by a second AP for two different channels of an example frequency band, in accordance with one or more techniques of the disclosure.

FIG. 8A is a simplified graph of example received signal strength indicator (RSSI) values (i.e., received power) received at a first AP of a wireless signal transmitted by a second AP versus the distance between the two APs for two different channels of an example frequency band. As described above with respect to FIGS. 7A and 7B, attenuation of the higher frequency channel indicated by curve 824 is greater with distance than the attenuation of the lower frequency channel indicated by curve 822. For example, the graph indicates that at a given distance, d, the signal from the first AP which is transmitted on the lower frequency channel 822 arrives at the second AP with a power higher given by the difference, Δ, than the power of a signal transmitted on the higher frequency channel 824. As a result, signals at a distance from the first AP may arrive at mobile devices at a lower power resulting in a lower signal to noise ratio (SNR). Communication between the mobile devices and the APs over the higher frequency channels may thus experience a higher error rate as compared to communications occurring over the lower frequency channels. To summarize, assuming that the transmit power is optimized for the first channel, the last channel would arrive at the second AP with lower power and as such may not provide mobile devices with sufficient power to support proper SNR.

Figure 8B:
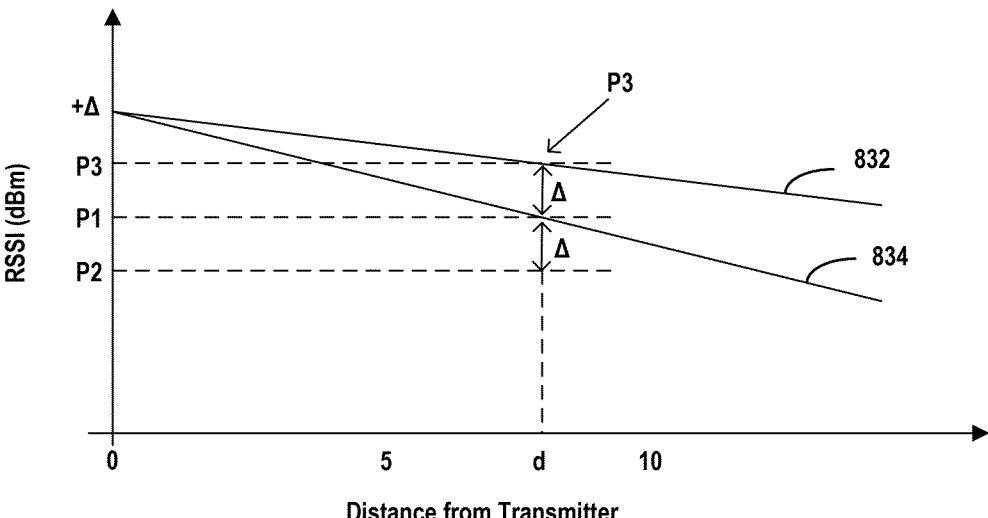

FIG. 8B illustrates an attempt to overcome the low SNR issue by increasing the transmit power of both channels (first channel 832 and second channel 834) by an equivalent amount (e.g., Δ). As a result, the power of the first channel

832 received at a distance d increases (by e.g., Δ) which may cause interference with signals from other APs that are also using the first channel.

In accordance with one or more techniques of the disclosure, in order to address one or more of these issues, a computing device, such as NMS 130/300 or other computing device executing radio resource management for the wireless network, optimizes one or more operating parameters of a plurality of APs in a wireless network based on the specific channel assignment for each of the APs. The optimized operating parameters may include, for example, a transmit power optimization. The optimized operating parameters for each specific channel may take into account, for example, an amount of attenuation (e.g., decay, power loss, difference in received signal strength, etc.) experienced at a threshold distance by wireless signals transmitted using the specific channel frequency. In some examples, the computing device automatically configures one or more APs in the wireless network with optimized operating parameters (including, for example, a transmit power optimization) associated with the specific channel assignments for the one or more APs. In some examples, the computing device further generates a notification indicative of the optimized operating parameters for the one or more APs for display on a user computing device associated with, for example, an IT technician.

Thus, for each specific channel, the transmit power of the APs assigned to that specific channel is adjusted by an amount associated with each specific channel. In some examples, the specific power adjustment for each channel further depends on the distance between the APs; e.g., on the specific topology of the wireless network.

For example, the transmit power for a specific channel of a given frequency band may be determined by Equation 1 as follows:

$$AP_j \text{ Power} = AP_j \text{ Power(base)} + \Delta RSSI(\text{band}) + \Delta RSSI \atop (\text{channel}) \qquad \text{Eq. 3}$$

where:

$AP_j$ Power(base)—baseline transmit power of the jth AP, given by Eq. 4

ΔRSSI(band)—transmit power optimization for the specific frequency band (e.g., 2.4 GHz, 5 GHz, 6 GHz, etc.)

ΔRSSI(channel)—transmit power optimization for the specific channel of the specific frequency band (i.e., sub-band).

In some examples, to ensure proper coverage with active APs (APs that have not been turned off) the baseline transmit power of each active AP (e.g., radio in each active AP) may be adjusted using Equation 4 as follows:

$$AP_j \text{ Power(base)} = \text{Max } AP_j \text{ Power} - \qquad \text{Eq. 4}$$
$$\sum_{i=1}^{n} Wt_{i \to j}(RSSI_{i \to j} + (\text{Max } AP_i \text{ Power} - AP_i \text{ current Power}))$$

where:

$AP_j$ Power—Power setting for the jth AP,

Max $AP_i$ Power—Maximum power setting for the ith AP,

Max $AP_j$ Power—Maximum power of the radio of the jth AP, n—number of strong neighbors of the jth AP (neighbors of the jth AP having an RSSI above a specified threshold)

$RSSI_{i \to j}$—signal strength of signal(s) received by $AP_j$ a as a result of transmission by $AP_i$.

In some examples, the transmit power optimization for the specific frequency band (ΔRSSI(band)) is a default value determined such that there is at least a threshold delta (e.g., 3 dBm) between the different frequency bands (e.g., 2.4 GHz, 5 GHz, 6 GHz etc.). However, this value may be varied for different sites based on the locations of the APs, AP density, and other factors. The default value may be learned offline for each site based on, for example, RSSI, usage and roaming pattern data received from wireless clients associated with the site For each specific channel of a given frequency band, a computing device, such as a network management system (NMS) or other computing device responsible for radio resource management, determines one or more transmit power optimization(s) for the channel, e.g., ΔRSSI(channel) in Equation 1 above. The transmit power optimization(s) for the specific channels adjust the transmit power of a plurality of APs in a wireless network based on transmission characteristics of wireless signals operating at the specific channel frequencies. In some examples, the transmit power optimization for each specific channel is dynamically determined based on RSSI information received from one or more wireless client devices operating on the specific channel. In some examples, the computing device automatically reconfigures one or more APs assigned to a specific channel with the optimized operating parameters, including the transmit power optimization(s) determined for the specific channel.

In some examples, the transmit power optimization(s) for each specific channel (e.g., ΔRSSI(channel) in Equation 3 above) is an adjustment to the transmit power for APs assigned to the specific channel, and is determined based on empirical (e.g., experimental) data obtained for each channel. For example, the transmit power optimization for each channel may be determined relative to a baseline transmit power determined for one of the plurality of channels. In some examples, the transmit power optimization for each channel is determined relative to a baseline transmit power determined for the first (lowest frequency) channel. A difference in RSSI values versus distance for each specific channel as compared to the baseline channel can be empirically determined using, for example, experimental data such as that shown in FIGS. 7A-7C. In some examples, the transmit power optimization for each specific channel is determined based on a difference in the RSSI values of wireless signals transmitted on the specific channel compared to that of wireless signals transmitted on the baseline channel at a selected distance.

Figure 8C:
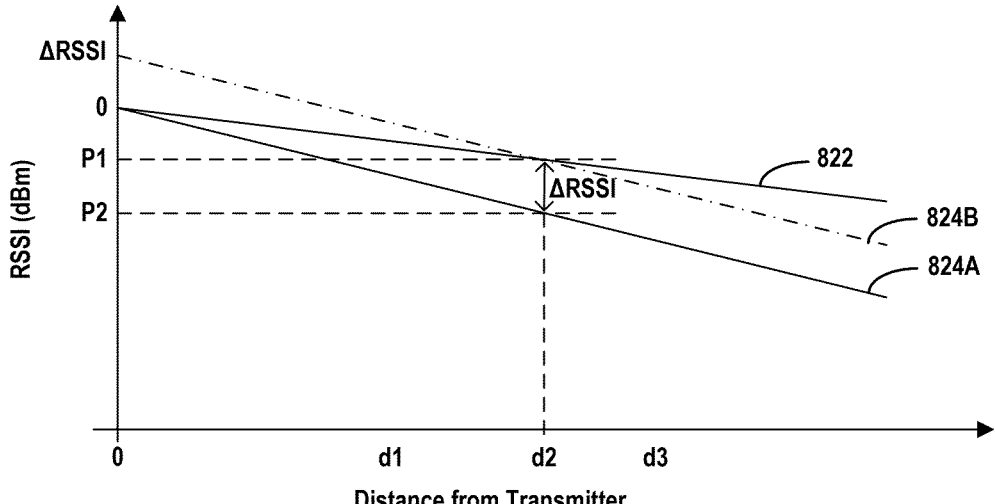

FIG. 8C is a graph showing an example transmit power optimization to a wireless signal of a specific channel of an example frequency band, in accordance with one or more techniques of the disclosure. Assume curve 822 represents RSSI versus distance for a first wireless signal transmitted at a first transmit power level using a first, lowest frequency channel of a given frequency band. Curve 824A represents RSSI versus distance for a second wireless signal transmitted at the first transmit power level using a second, relatively higher frequency channel of the given frequency band. An adjustment to the transmit power for the second, relatively higher frequency channel, ΔRSSI, may be determined based on the difference between RSSI values of the first and second wireless signals at a selected distance, in this example, distance d2. In this example, APs configured to operate at the second, relatively higher frequency, are configured to apply the transmit power optimization ΔRSSI to wireless signals transmitted at the second, relatively higher frequency, as indicated by curve 824B. Curve 824B represents RSSI versus distance for the second wireless signal transmitted at a second, optimized transmit power level using the second, relatively higher frequency channel. In general, optimization of the transmit power for each specific channel of a given frequency band results in an increase in the received power (RSSI) over the transmission range of interest for each specific channel and/or AP.

Figure 9A:
FIGS. 9A and 9B are tables showing optimized transmit power optimizations for a plurality of channels, in accordance with one or more techniques of the disclosure.

Transmit power optimizations for each specific channel of a given frequency band may be similarly determined, resulting in transmit power optimization data such as that shown in FIG. 9A. FIG. 9A is a table 902 of example transmit power optimizations for a plurality of channels of an example frequency band, in accordance with one or more techniques of the disclosure. In example of FIG. 9A, each specific channel (e.g., channels 1-233 in the 6 GHz example) includes an associated transmit power optimization (e.g., ΔRSSI(channel) as shown in column 2) determined at a selected or threshold distance (or, e.g., based on an average of RSSI values received by wireless clients at the selected distance). In some examples, the selected distance is determined based on an expected average distance between wireless clients at the site and the associated APs. For example, the selected distance may include a range of 10-15 meters. In other examples, the distance may be selected based on the average distance between the said AP and its neighbors, the distance to the crossest AP, or the distance to the further AP, or any other measure of the distances to the neighboring APs.

The data shown in table 902 may be stored as, for example, channel parameters 137/252/317 as described with respect to FIGS. 1A, 1, 2 and/or 3. In this example, the plurality of channels include channels 1-233 of the 6 GHz frequency band; however, it shall be understood that transmit power optimizations may be generated for one or more channels of any other frequency bands, including lower frequency bands and/or higher frequency bands, and the disclosure is not limited in this respect.

Figure 9B:

In accordance with one or more techniques of the disclosure, in some examples, for each specific channel, a plurality of transmit power optimizations, each corresponding to one of a plurality of distances are determined. FIG. 9B shows a table 904 of example transmit power optimizations for a plurality of channels, 1-i, of an example frequency band at each of a plurality of distances, d1-dn. In example of FIG. 9B, each specific channel (e.g., channels 1-i as listed in column 1) includes a plurality of associated transmit power optimizations (e.g., ΔRSSIi-n as shown in column 3), each corresponding to one of a plurality of distances, d1-dn, as shown in column 2. The data of table 904 may be stored as, for example, channel parameters 137/252/317 as described with respect to FIGS. 1A, 1B, 2 and/or 3.

In some examples, a computing device, such as NMS 130/300 or other computing device executing radio resource management for the wireless network, configures APs in the wireless network to adjust their transmit power based on the transmit power optimization corresponding to their assigned operating channel. In examples such as shown in FIG. 9A, where a single transmit power optimization value is determined for each channel, the APs are configured to adjust their transmit power using the transmit power optimization value associated with their assigned operating channel. In examples such a that shown in FIG. 9B, where a plurality of transmit power optimization values are determined for each channel, each corresponding to a different distance, the computing device selects one of the distances, d1-dn, at which the transmit power optimization is selected. The computing device selects one of the distances, d1-dn, based on one or more factors.

In some examples, the transmit power optimization for each of the channels 1-i is based on the same selected distance, (e.g., the same one of distances d1-dn for all of the channels 1-i). In other examples, the transmit power optimization for the specific channels may be based on different selected distances; for example the selected distance for a first may be a first distance (e.g., the distance for channel 3 may be a first distance, "d2") while the selected distance for a second channel may be a second, different distance (e.g., the distance for channel 177 may be "d5"), etc.

In another example, the data from which to determine the transmit power optimizations associated with each of a plurality of channels of a given frequency band may be collected from a plurality of wireless client devices associated with the wireless network. Wireless client devices, such as smart phones, tablet computers, IoT devices, and other mobile or stationary wireless client devices, transmit RSSI information for received wireless signals to the AP with which they are associated. The APs, in turn, transmit this RSSI information measured by the wireless clients to NMS 130/300 or other computing device configured for radio resource management of the wireless network. This RSSI information received from the wireless client devices, along with location information determined for each of the wireless client devices (as determined by, for example, location engine 370 of NMS 130/300, may be used to generate RSSI versus distance information for each channel of a given frequency band. The transmit power optimization for each specific channel may be determined based on a difference between an RSSI of the specific channel as compared to an RSSI of a baseline channel (such as the lowest numbered or lowest frequency channel) at a selected distance.

In some examples, the transmit channel optimization for the plurality of channels may be dynamically updated over time based on the RSSI versus distance information that is periodically or continuously received for the plurality of wireless client devices.

In addition, if the RSSI versus distance information received for the plurality of wireless client devices indicates that certain locations or regions are experiencing interference on certain channels at certain distances (e.g., the wireless client devices are experiencing errors), the computing device may lower the transmit power of one or more APs. As another example, if the RSSI versus distance information received for the plurality of wireless client devices indicates that certain locations or regions there experiencing coverage holes on certain channels at certain distance (again as measured by the mobile devices), the computing device may increase the transmit power of one or more APs.

Figure 10A:
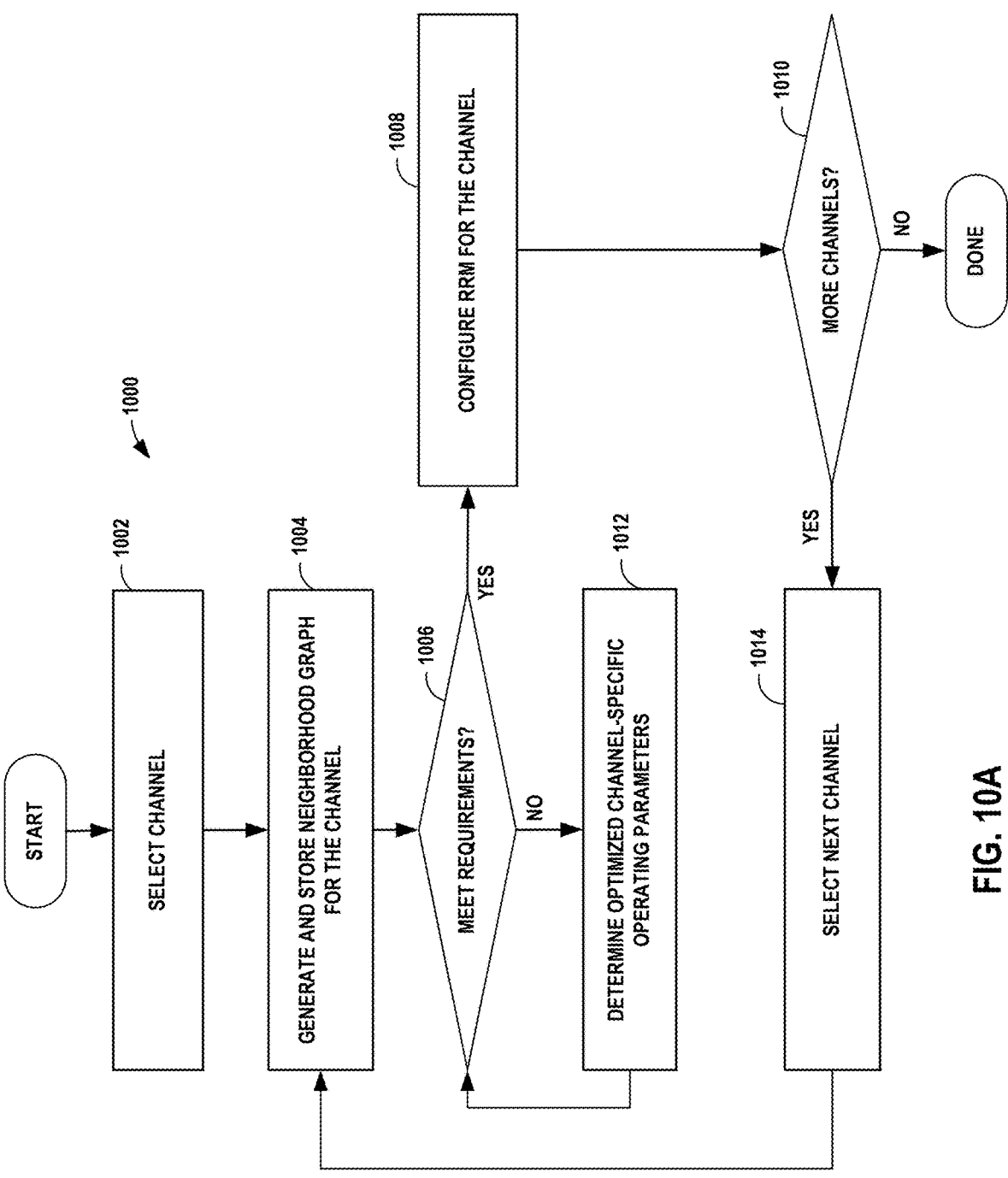
FIG. 10A is a flowchart of an example process by which a computing device determines one or more optimized channel-specific operating parameters for a plurality of APs in a wireless network, in accordance with one or more techniques of the disclosure.

FIG. 10A is a flowchart of an example process (1000) by which a computing device, such as NMS 130/300 or other computing device executing a radio resource management module for a wireless network, determines one or more optimized channel-specific operating parameters for a plurality of APs in a wireless network, in accordance with one or more techniques of the disclosure. In some examples, the channel-specific operating parameters include, but are not limited to, a transmit power optimization based on the channel assignment for each the plurality of APs.

The computing device selects one of the plurality of channels (1002). For example, the computing device may select channel 1 of the 6 GHz frequency band. The computing device generates and stored a neighborhood graph for the channel (1004). For example, the neighborhood graph is indicative of neighbor relationships between APs in the wireless network assigned to operate on the selected channel. For example, a neighborhood graph may be generated based on signal strength (e.g., RSSI) measurements of wireless signals transmitted using the selected channel by a first AP and received by a second AP. In some examples, two APs are considered to be "neighbors" if the RSSI of a wireless signal transmitted by a first AP using the selected channel and received and measured by a second AP is greater than a predetermined threshold. The RSSI measured by each AP from a wireless signal on the selected channel originating from one or more other APs is measured and compared against a predefined threshold. A path for which the measured RSSI is above the threshold is marked as a connection (edge) in the neighborhood graph, connecting the two respective APs (nodes in the neighborhood graph).

The computing device analyzes the neighborhood graph to determine whether the neighborhood graph, which represents the topology of the wireless network for the selected channel, meets requirements (1006). For example, the graph is examined to ensure proper reception (e.g., good signal-to-noise ratio (SNR)) in the various geographical locations, while avoiding interference between neighboring APs. Example techniques for analyzing and adjusting radio settings for a plurality of APs in a wireless network are described in U.S. Pat. No. 11,129,027, issued Sep. 21, 2021, entitled, "Intelligent Radio Band Reconfiguration of Access Points in a Wireless Network", which is incorporated by reference herein in its entirety.

If the topology does not meet the requirements (NO branch of 1006), the computing device determines one or more optimized operating parameters for the selected channel (1012). For example, the computing device may determine a channel-specific transmit power optimization to be applied to the APs assigned to the selected channel. The computing device checks and continues to optimize the power of the APs for the said frequency channel. In some examples, the optimization (1012) may take into account the channel occupancy (i.e., the number of wireless client devices using the selected channel as compared to the channel occupancy of one or more of the other channels), the number of APs assigned to the selected channel as compared to the number of APs assigned to one or more of the other channels, and/or any other parameters of the wireless network relevant to the assessment of the operating parameters of the APs.

If the computing device determines that a satisfactory topology has been achieved for the selected channel (YES branch of 1006), the computing device automatically instructs the APs to use the channel-specific optimized operating parameters for the selected channel, e.g., the channel-specific transmit power optimization corresponding to the selected channel), when assigned to operate using the selected channel (1008).

The computing device determines whether there are more channels for which an RRM configuration is to be determined (1010). If there are more channels (YES branch of 1010), the computing device selects the next channel (1002) and process (1002)-(1014) is repeated for all of the channels in the given frequency band. If the computing device determines that an RRM configuration has been determined for all of channels in the given frequency band (NO branch of 1010) the process is complete.

In another example, process (1000) continuously or periodically repeats such that the RRM configurations of each channel are dynamically updated on a continuous, periodic, or scheduled basis. In another example, process (1000) is repeated upon experiencing a specific event, e.g., malfunctioning of a specific AP, addition of one or more new APs, removal of one or more APs, etc.

Figure 10B:
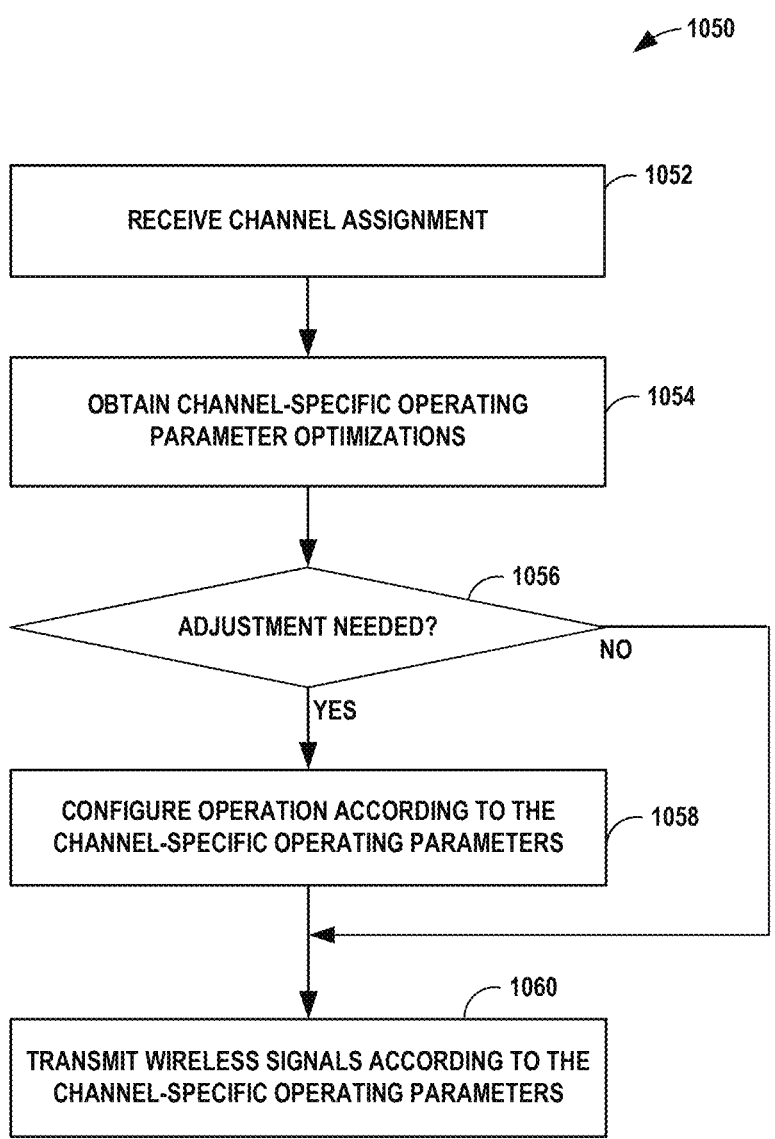
FIG. 10B is a flowchart of an example process by which an AP configures operation according to channel-specific operating parameters corresponding to an assigned communication channel, in accordance with one or more techniques of the disclosure.

FIG. 10B is a flowchart of an example process (1050) by which an AP including one or more processors executing a communications manager configures operation according to channel-specific operating parameters corresponding to an assigned channel, in accordance with one or more techniques of the disclosure. The AP receives a channel assignment indicative of one of a plurality of communication channels of a given frequency band over which the AP is to transmit and receive wireless signals (1052). The AP obtains channel-specific operating parameter optimizations corresponding to the assigned channel (1054). In some examples, the AP stores a plurality of channel-specific operating parameter optimizations, each corresponding to a different one of a plurality of communication channels of the given frequency band. The AP refers to the stored channel-specific operation parameter optimizations and retrieves the channel-specific operational parameter optimization corresponding to the assigned channel. The stored channel-specific operating parameters may be stored by the AP as, for example, a data structure or table such as that shown in FIGS. 9A and/or 9B and stored in channel-specific operating parameters 252 as shown in FIG. 2. In other examples, the AP receives the channel-specific operational parameter optimization from NMS 130/300 or other computing device executing RRM module 134/338; for example, at or near the time of receiving the channel assignment.

The AP determines whether an adjustment to the current operational parameter configuration(s) of the AP are needed (1056). If an adjustment is needed (YES branch of 1056), the AP configures operation according to the channel-specific operating parameters corresponding to the assigned channel (1058). The AP transmits wireless signals according to the channel-specific operating parameters (1060). If no adjustment to the AP operational configuration is needed (e.g., the AP is already configured according to the channel-specific operating parameters) (NO branch of 1056), the AP transmit wireless signals according to the channel-specific operating parameters corresponding to the assigned channel (1060). The process (1050) may be continuously or periodically repeated to confirm the current channel-specific configuration, and/or upon receipt of a new channel assignment.

For example, the AP may obtain a channel-specific transmit power optimization corresponding to the assigned channel (1054). The AP determines whether an adjustment to the current transmit power configuration of the AP are needed (1056). For example, the AP may determine whether a current transmit power configuration for the AP matches the channel-specific transmit power optimization for the assigned channel. If an adjustment is needed (YES branch of 1056), the AP configures the transmit power of its wireless transmitter(s) according to the channel-specific transmit power optimization corresponding to the assigned channel (1058). The AP is then configured to transmit wireless signals according to the channel-specific transmit power optimization corresponding to the assigned channel for the AP (1060). Each time a new channel assignment is received (1052) (or alternatively, on a continuous, periodic, or scheduled basis), the AP repeats process (1050) to configure its operating parameters corresponding to the channel-specific operating parameters corresponding to the assigned channel.

The techniques of the disclosure may provide one or more technical advantages and practical applications. For example, the techniques provide for automatic optimization of one or more operating parameters for APs in a wireless network on a per channel basis. Automatic optimization of the operating parameters for each channel of a given frequency band helps to reduce co-channel interference across all channels of the given frequency band. At the same time, the techniques help to ensure that transmit power levels, particularly for wireless signals transmitted using the higher frequency channels, are sufficient to provide good wireless network performance at greater distances. In some examples, the system determines the one or more optimized operating parameters specific to each channel, and also reconfigures the APs in the wireless network for operation using the optimized operating parameters corresponding to their specific channel assignments. By automatically reconfiguring the APs with operating parameters optimized for each specific channel, APs in a wireless network are able to continuously and/or periodically self-optimize based on their assigned operating channel, thus reducing time and costs associated with manual radio resource management. By reducing co-channel interference and/or increasing the reliability of the signal at greater distances, the techniques improve the overall operational performance of the wireless network, further resulting in an improved user experience.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBeem, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:
one or more processors; and
a memory comprising instructions that when executed by the one or more processors cause the one or more processors to:
determine, a difference between attenuation of wireless signals transmitted using an assigned frequency channel of a given frequency band and attenuation of wireless signals transmitted using a baseline frequency channel of the given frequency band lower in frequency than the assigned frequency channel, and
automatically configure, based on the difference, a transmit power of an access point (AP) for the assigned frequency channel.

2. The system of claim 1, wherein to determine the difference, the instructions further cause the one or more processors to:
determine the difference between attenuation of wireless signals transmitted using the assigned frequency channel of the given frequency band at a selected distance and attenuation of wireless signals transmitted using the baseline frequency channel of the given frequency band at the selected distance.

3. The system of claim 1, wherein the given frequency band is a 6 GHz frequency band comprising a plurality of frequency including one or more of 20 MHz channels, 40 MHz channels, 80 MHz channels, or 160 MHz channels.

4. The system of claim 1, the memory further comprising instructions that when executed by the one or more processors cause the one or more processors to:
generate a neighborhood graph of a plurality of APs, including the AP, assigned to the assigned frequency channel of the given frequency band; and reconfigure one or more APs of the plurality of APs assigned to the assigned frequency channel of the given frequency band with the transmit power.

5. The system of claim 1, the memory further comprising instructions that when executed by the one or more processors cause the one or more processors to:

determine, for each frequency channel of a plurality of frequency channels of the given frequency band, a difference between attenuation of wireless signals transmitted using a corresponding frequency channel of the plurality of frequency channels and attenuation of wireless signals transmitted using the baseline frequency channel of the given frequency band; and automatically configure, based on the difference determined for each frequency channel of the plurality of frequency channels, a corresponding transmit power of the AP for each frequency channel of the plurality of frequency channels of the given frequency band.

6. The system of claim 1, the memory further comprising instructions that when executed by the one or more processors cause the one or more processors to:

determine channel assignments for a plurality of APs, including the AP; and configure one or more APs of the plurality of APs assigned to the assigned frequency channel with the transmit power for the assigned frequency channel.

7. The system of claim 1, wherein to determine the difference, the instructions further cause the one or more processors to:

determine the difference between attenuation of wireless signals transmitted by one or more APs of a plurality of APs, including the AP, and received by one or more wireless client devices using the assigned frequency channel at one or more selected distances and attenuation of wireless signals transmitted by one or more APs of the plurality of APs and received by one or more wireless client devices using the baseline frequency channel at the one or more selected distances.

8. The system of claim 1, the memory further comprising instructions that when executed by the one or more processors cause the one or more processors to:

generate a neighborhood graph of a plurality of APs, including the AP, assigned to the assigned frequency channel of the given frequency band;

determine a measure of distance between the AP and one or more neighbor APs of the plurality of APs;

determine the transmit power based on the given frequency band and the measure of distance; and reconfigure one or more APs of the plurality of APs assigned to the assigned frequency channel of the given frequency band with the transmit power.

9. The system of claim 1, the memory further comprising instructions that when executed by the one or more processors cause the one or more processors to:

generate a neighborhood graph of a plurality of APs, including the AP, assigned to the assigned frequency channel of the given frequency band;

determine a measure of distance between the AP and mobile and static devices associated with the AP;

determine the transmit power based on the given frequency band and the determined distance measure; and reconfigure one or more APs of the plurality of APs assigned to the assigned frequency channel of the given frequency band with the transmit power.

10. A method comprising:

determining a difference between attenuation of wireless signals transmitted using an assigned frequency channel of a given frequency band and attenuation of wireless signals transmitted using a baseline frequency channel of the given frequency band lower in frequency than the assigned frequency channel; and automatically configuring, based on the difference, a transmit power of an access point (AP) for the assigned frequency channel.

11. The method of claim 10, wherein determining the difference further comprises:

determining the difference between attenuation of wireless signals transmitted using the assigned frequency channel of the given frequency band at a selected distance and attenuation of wireless signals transmitted using the baseline frequency channel of the given frequency band at the selected distance.

12. The method of claim 10, wherein the given frequency band is a 6 GHz frequency band comprising a plurality of frequency channels including one or more of 20 MHz channels, 40 MHz channels, 80 MHz channels, or 160 MHz channels.

13. The method of claim 10, further comprising:

generating a neighborhood graph of a plurality of APs, including the AP, assigned to the assigned frequency channel of the given frequency band; and reconfiguring one or more APs of the plurality of APs assigned to the assigned frequency channel of the given frequency band with the transmit power.

14. The method of claim 10, further comprising:

determining, for each frequency channel of a plurality of frequency channels of the given frequency band, a difference between attenuation of wireless signals transmitted using a corresponding frequency channel of the plurality of frequency channels and attenuation of wireless signals transmitted using the baseline frequency channel of the given frequency band; and automatically configuring, based on the difference determined for each frequency channel of the plurality of frequency channels, a corresponding transmit power of the AP for each frequency channel of the plurality of frequency channels of the given frequency band.

15. The method of claim 10, wherein determining the difference further comprises:

determining the difference between attenuation of wireless signals transmitted by one or more APs of a plurality of APs, including the AP, and received by one or more wireless client devices using the assigned frequency channel at one or more selected distances and attenuation of wireless signals transmitted by one or more APs of the plurality of APs and received by one or more wireless client devices using the baseline frequency channel at the one or more selected distances.

16. The method of claim 10, further comprising:

generating a neighborhood graph of a plurality of APs, including the AP, assigned to the assigned frequency channel of the given frequency band;

determining a measure of distance between the AP and one or more neighbor APs of the plurality of APs;

determining the transmit power based on the given frequency band and the measure of distance; and reconfiguring one or more APs of the plurality of APs assigned to the assigned frequency channel of the given frequency band with the transmit power.

17. The method of claim 10, further comprising:

generating a neighborhood graph of a plurality of APs, including the AP assigned to the assigned frequency channel of the given frequency band;

determining a measure of distance between an AP and mobile and static devices associated with the AP;

determining the transmit power based on the given frequency band and the determined distance measure; and reconfiguring one or more APs of the plurality of APs assigned to the assigned frequency channel of the given frequency band with the transmit power.

18. Non-transitory computer-readable media comprising instructions that when executed by one or more processors cause the one or more processors to:

determine, a difference between attenuation of wireless signals transmitted using an assigned frequency channel of a given frequency band and attenuation of wireless signals transmitted using a baseline frequency channel of the given frequency band lower in frequency than the assigned frequency channel.

19. The system of claim 1, wherein to automatically configure the transmit power, the one or more processors are configured to increase the transmit power for the AP for the assigned frequency channel.

20. The method of claim 10, wherein automatically configuring the transmit power further comprises:

increasing the transmit power for the AP for the assigned frequency channel.

* * * * *